United States Patent
Hogan

(10) Patent No.: US 10,710,616 B2
(45) Date of Patent: Jul. 14, 2020

(54) RAILROAD TRACK POWERED MEASUREMENT DEVICE AND RAILROAD MEASUREMENT SYSTEM

(71) Applicant: Siemens Industry, Inc., Alpharetta, GA (US)

(72) Inventor: Brian Joseph Hogan, Temecula, CA (US)

(73) Assignee: SIEMENS MOBILITY, INC., New York City, NY (US)

( * ) Notice: Subject to any disclaimer, the term of this patent is extended or adjusted under 35 U.S.C. 154(b) by 334 days.

(21) Appl. No.: 15/603,788

(22) Filed: May 24, 2017

(65) Prior Publication Data
US 2018/0339718 A1    Nov. 29, 2018

(51) Int. Cl.
| | | |
|---|---|---|
| *B61L 1/18* | (2006.01) |
| *B61L 25/02* | (2006.01) |
| *G01M 17/08* | (2006.01) |
| *B61L 29/30* | (2006.01) |
| *B61L 29/22* | (2006.01) |
| *B61L 27/00* | (2006.01) |
| *B61L 1/20* | (2006.01) |

(52) U.S. Cl.
CPC .............. *B61L 1/188* (2013.01); *B61L 1/181* (2013.01); *B61L 1/20* (2013.01); *B61L 25/021* (2013.01); *B61L 25/025* (2013.01); *B61L 27/0088* (2013.01); *B61L 29/226* (2013.01); *B61L 29/30* (2013.01); *G01M 17/08* (2013.01)

(58) Field of Classification Search
CPC .. B61L 1/188; B61L 1/181; B61L 1/20; B61L 25/021; B61L 25/025; B61L 27/0088; B61L 29/226; B61L 29/30; G01M 17/08
See application file for complete search history.

(56) References Cited

U.S. PATENT DOCUMENTS

| | | | |
|---|---|---|---|
| 3,603,786 A * | 9/1971 | Peel ....................... | B61L 29/286 246/128 |
| 3,838,271 A * | 9/1974 | Ackard .................. | B61L 29/286 246/125 |
| 8,899,530 B2 | 12/2014 | Hogan | |
| 2006/0076461 A1 | 4/2006 | Derose et al. | |
| 2009/0216395 A1* | 8/2009 | Kernwein ............. | B61L 25/025 701/20 |
| 2011/0011985 A1* | 1/2011 | Hogan ................... | H04L 27/10 246/34 R |
| 2014/0263858 A1 | 9/2014 | Hogan | |
| 2018/0257685 A1* | 9/2018 | Nagrodsky ........... | B61L 25/025 |

FOREIGN PATENT DOCUMENTS

WO       2012131683 A2    10/2012

* cited by examiner

*Primary Examiner* — Regis J Betsch

(57) ABSTRACT

A railroad measurement system includes a railroad track powered measurement device providing measurement signals of electrical quantities across rails of a railroad track; a wayside control device adapted to receive the measurement signals provided by the railroad track powered measurement device; and a communication network interfacing with the railroad track powered measurement device and adapted to transmit data, wherein the railroad track powered measurement device is adapted to transmit the measurement signals of the electrical quantities via the communication network, and the wayside control device is adapted to receive the measurement signals.

10 Claims, 3 Drawing Sheets

RAILROAD TRACK POWERED MEASUREMENT DEVICE AND RAILROAD MEASUREMENT SYSTEM

BACKGROUND

1. Field

Aspects of the present invention generally relate to a railroad track powered measurement device and a railroad measurement system.

2. Description of the Related Art

Track circuits may be used in the railroad industry to detect the presence of a train in a block or section of track. Track circuit hardware may include transmitters and receivers configured to work with coded alternating current (AC), coded direct current (DC), or audio frequency (AF) signals. Different track circuits may function in different ways to detect trains and may therefore have different hardware requirements. For example, some track circuits (such as AC overlay circuits) may have a transmitter configured to transmit a signal through the track rails at one end of a block of track and a receiver connected to the rails at the other end of the block and configured to detect the signal. Other than the connection through the track rails, there may typically be no connection between the transmitter and receiver for a block. When a train is present in a block of track monitored by a track circuit, the train may shunt, or short, the two rails, with the result that no signal is received at the receiver. Thus, the receiver may use the presence or absence of a detected signal to indicate whether or not a train is present in the block.

In some other track circuits, sometimes referred to as constant warning time circuits, a transmitter may transmit a signal over a circuit formed by the rails of the track and one or more shunts positioned at desired approach distances from the transmitter. A receiver may detect one or more resulting signal characteristics, and a logic circuit such as a microprocessor or hardwired logic may detect the presence of a train and may determine its speed and distance from a location of interest such as a crossing. The track circuit may detect a train and determine its distance and speed by measuring impedance changes due to the train's wheels and axle acting as a shunt across the rails and thereby effectively shortening the length (and hence the impedance) of the rails in the circuit. An example of an apparatus including constant warning time circuit(s) is a constant warning time device, also referred to as a grade crossing predictor (GCP) in the U.S. or a level crossing predictor in the U.K., which will use information provided by the constant warning time circuit(s) to generate constant warning time signal(s) for controlling crossing warning device(s). Those of skill in the art will recognize that other configurations of track circuits are possible.

Currently, track circuit voltage and current measurement(s) is done using wires or cables, i.e. hardwired, from wayside monitoring equipment such as for example a GCP or other wayside control device, to the track circuit. The wires or cables are typically multi conductor cables which are expensive. Further, the cabling needs to be installed and maintained by trained personnel which is an additional expense.

SUMMARY

Briefly described, aspects of the present invention relate to a railroad track powered measurement device and a railroad measurement system. Railroad measurement systems can include different types of railroad track circuits. An example is a constant warning time circuit provided in connection with a constant warning time device, herein referred to as GCP or GCP system.

A first aspect of the present invention provides a railroad track powered measurement device comprising a measurement circuit operably coupled between rails of a railroad track and adapted to measure electrical quantities across the rails and to provide measurement signals of the electrical quantities; and a communications processor adapted to communicate the measurement signals of the electrical quantities to a wayside control device.

A second aspect of the present invention provides a railroad measurement system comprising a railroad track powered measurement device providing measurement signals of electrical quantities across rails of a railroad track; a wayside control device adapted to receive the measurement signals provided by the railroad track powered measurement device; and a communication network interfacing with the railroad track powered measurement device and adapted to transmit data, wherein the railroad track powered measurement device is adapted to transmit the measurement signals of the electrical quantities via the communication network, and the wayside control device is adapted to receive the measurement signals.

DETAILED DESCRIPTION

To facilitate an understanding of embodiments, principles, and features of the present invention, they are explained hereinafter with reference to implementation in illustrative embodiments. In particular, they are described in the context of being a track powered measurement device and a railroad measurement system. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
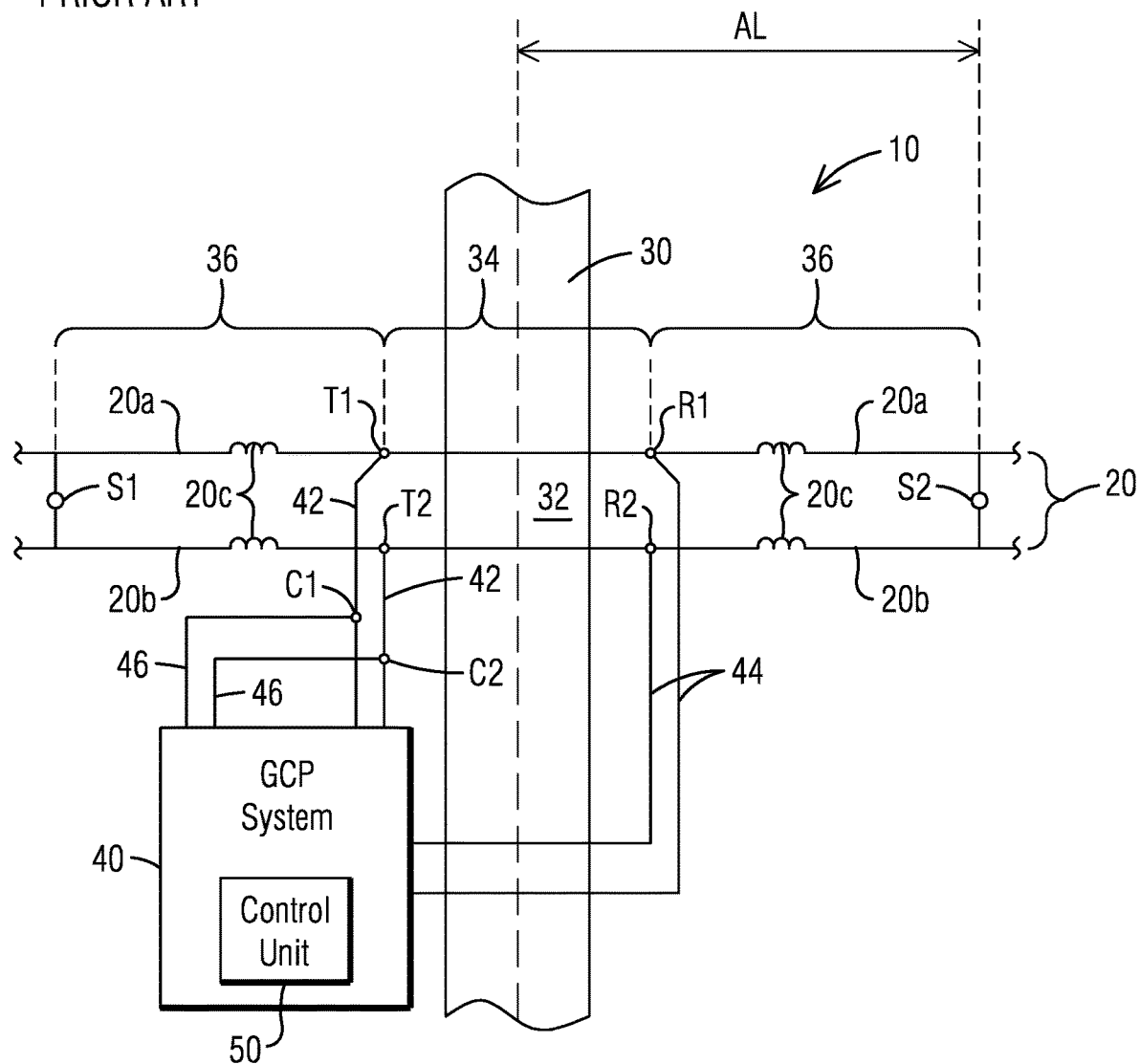
FIG. 1 illustrates an example railroad monitoring and control system in accordance with an embodiment disclosed herein.

FIG. 1 illustrates a known railroad crossing control system 10 in accordance with a disclosed embodiment, where a road 30 crosses a railroad track 20. The crossing of the road 30 and the railroad track 20 forms an island 32. The railroad track 20 includes two rails 20a, 20b and a plurality of ties (not shown in FIG. 1) that are provided over and within railroad ballast (not shown in FIG. 1) to support the rails 20a, 20b. The rails 20a, 20b are shown as including inductors 20c. The inductors 20c, however, are not separate physical devices but rather are shown to illustrate the inherent distributed inductance of the rails 20a, 20b.

The system 10 includes a constant warning time device 40, herein also referred to as grade crossing predictor (GCP) or GCP system, which comprises a transmitter that connects to the rails 20a, 20b at transmitter connection points T1, T2 on one side of the road 30 via transmitter wires 42. The constant warning time device 40 also comprises a main receiver that connects to the rails 20a, 20b at main receiver connection points R1, R2 on the other side of the road 30 via receiver wires 44. The receiver wires 44 are also referred to as main channel receiver wires. The constant warning time device 40 further comprises a check receiver that connects to the rails 20a, 20b at check receiver connection points C1, C2 via check channel receiver wires 46. The check channel receiver wires 46 are connected to the track 20 on the same side of the road 30 as the transmitter wires 42, resulting in a six-wire system. The main channel receiver and check channel receiver operate in much the same manner with an incoming train move, providing a parallel check of the main channel operation. Those of skill in the art will recognize that the transmitter and receivers (main channel receiver and check channel receiver), other than the physical conductors that connect to the track 20, are often co-located in an enclosure located on one side of the road 30.

The constant warning time device 40 includes a control unit 50 connected to the transmitter and receivers. The control unit 50 includes logic, which may be implemented in hardware, software, or a combination thereof, for calculating train speed, distance and direction, and producing constant warning time signals for the railroad crossing system 10. The control unit 50 can be for example integrated into a central processing unit (CPU) module of the GCP system 40 or can be separate unit within the GCP system 40 embodied as a processing unit such as for example a microprocessor.

Also shown in FIG. 1 is a pair of termination shunts S1, S2, one on each side of the road 30 at a desired distance from the center of the island 32. It should be appreciated that FIG. 1 is not drawn to scale and that both shunts S1, S2 are approximately the same distance away from the center of the island 32. The termination shunts S1, S2, are arranged at predetermined positions corresponding to an approach length AL required for a specific warning time (WT) for the GCP system 40. For example, if a total WT of 35 seconds (which includes 30 seconds of WT and 5 seconds of reaction time of the GCP system 40) at 60 mph maximum authorized speed (MAS) of a train is required, an calculated approach length AL is 3080 feet. Thus, the shunts S1, S2 are arranged each at 3080 feet from the center of the island 32. It should be noted that one of ordinary skill in the art is familiar with calculating the approach length AL. The termination shunts S1, S2 can be embodied for example as narrow band shunts (NBS).

FIG. 1 further illustrates an island circuit 34 which is the area between transmitter connection points T1, T2 and main receiver connection points R1, R2. For example, the constant warning time device 40 monitors the island circuit 34 as well as approach circuits 36 which lie to the right and left of the island circuit 34, i.e., between the island circuit 34 and the termination shunts S1, S2.

Typically, the shunts S1, S2 positioned on both sides of the road 30 and the associated constant warning time device 40 are tuned to the same frequency. This way, the transmitter can continuously transmit one AC signal having one frequency, the receiver can measure the voltage response of the rails 20a, 20b and the control unit 50 can make impedance and constant warning time determinations based on the one specific frequency. When a train crosses one of the termination shunts S1, S2, the train's wheels and axles act as shunts, which lower the inductance, impedance and voltage measured by the corresponding control unit 50. Measuring the change in the impedance indicates the distance of the train, and measuring the rate of change of the impedance (or integrating the impedance over time) allows the speed of the train to be determined.

Figure 2:
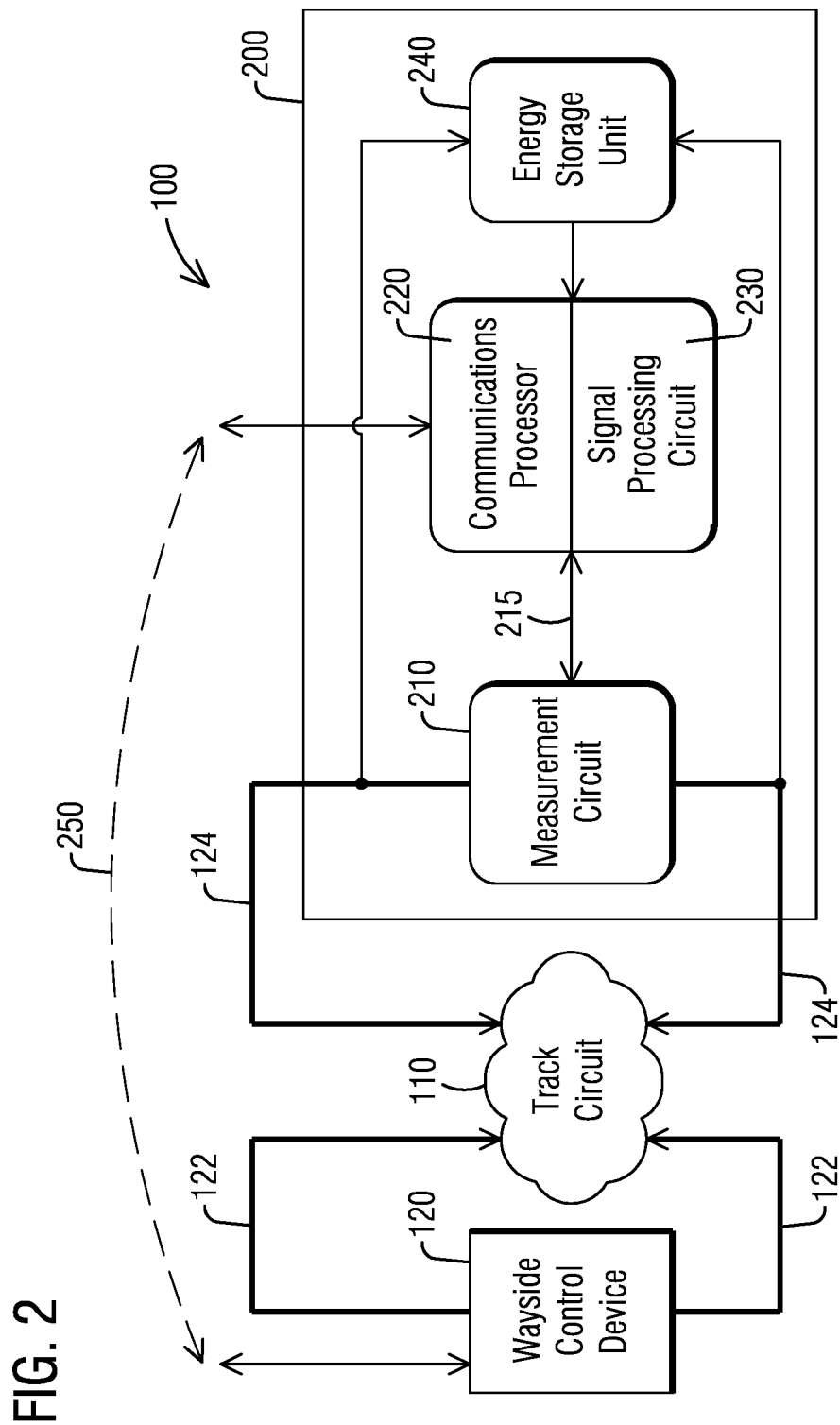
FIG. 2 illustrates a schematic of an embodiment of a railroad measurement system in accordance with an exemplary embodiment of the present invention.

FIG. 2 illustrates a schematic of an embodiment of a railroad measurement system 100 in accordance with an exemplary embodiment of the present invention. The system 100 is provided and utilized in connection with a railroad track circuit 110. As described before, track circuits are used to detect the presence of a train in a block or section of track. Track circuit hardware may include transmitters and receivers configured to work with coded alternating current (AC), coded direct current (DC), or audio frequency (AF) signals. The track circuit 110 can be configured as a constant warning time circuit provided in connection with a constant warning time device, herein also referred to as GCP system.

The track circuit 110 is coupled to and in communication with a wayside control device 120, which can be a GCP or a switch machine or some other type of wayside monitoring and/or controlling equipment. The wayside control device 120 is illustrated as one component, but can comprise multiple components which together form the wayside control device 120. The wayside control device 120 is typically located in proximity to the railroad track or a railroad grade crossing when the control device 120 is a GCP.

The system 100 comprises one or more transmitters coupled to rails of a railroad track. The transmitters are illustrated as transmitter connections 122 from the wayside control device 120 to the track circuit 110. The transmitters are a type of electrical device configured to transmit signal(s) through the rails. Signals can be for example coded alternating current (AC), coded direct current (DC), or audio frequency (AF) signals. The transmitters connections 122 to the wayside control device 120 can be hardwired and include for example cables or wires. The wayside control device 120 comprises a signal source and generates signal(s) to be transmitted by the transmitters across the rails. The transmitters form a part of the track circuit 110.

According to an embodiment, the measurement system 100 further comprises a railroad track powered measurement device 200, herein also referred to as measurement device 200. The measurement device 200 is an electric and/or electronic device coupled to rail(s) of a railroad track and comprising different components.

According to one aspect, the measurement device 200 is designed to include functionality of receiver(s) of the track circuit 110. As described before, receivers are configured to detect signal(s) transmitted by the transmitters. While the transmitters 122 are coupled to the rail at one end of a track block, the receivers are physically coupled to the rails at the other end of the track block (see also FIG. 1). The measurement device 200 comprises a measurement circuit 210 that is adapted to measure electrical quantities across the rail(s) and to provide measurement signals of the electrical quantities based on the signal(s) transmitted by the transmitters via transmitter connections 122. In other words, the measurement circuit 210 is designed to provide the function of receivers of the track circuit 110. The measurement circuit 210 is physically coupled to the rail(s) via receiver connections 124 in order to measure the electrical quantities. Specifically, the measurement circuit 210 is adapted to measure voltage and current present at the rails of the railroad track. The receiver connections 124 between the measurement circuit 210 and the rails can be for example cable or wires, i.e. hardwired. In an embodiment, the measurement device 200 is coupled between the rails of the railroad track in a similar manner as for example termination shunts. A power source for the measurement circuit 210 and the measurement device 200 is a voltage potential across the rails provided by the wayside control device 120 via the transmitters and transmitter connections 122.

With further reference to FIG. 2, the measurement device 200 comprises a communications processor 220 adapted to communicate the measurement signals of the electrical quantities, i.e. voltage and current, provided by the measurement circuit 210, to the wayside control device 120. Thus, the communications processor 220 is in communication with the measurement circuit 210 and receives the measurement signals via communication connection 215. The communications processor 220 communicates the measurement signals to the wayside control device 120 directly or indirectly.

In an embodiment, the communications processor 220 is configured as a wireless communications processor and communicates the measurement signals directly to the wayside control device 120. In this case, a communication network 250 is configured as wireless communication network, and the wireless communications processor transmits the signals via the wireless communication network, for example using a radio frequency transmission. This embodiment is described in more detail with reference to FIG. 3.

In an alternative embodiment, the communications processor 220 can be configured to communicate the measurement signals to the transmitters of the system 100, wherein the transmitter connections 122 are then utilized to transmit the signals from the transmitters to the wayside control device 120 using their existing wired connection to the wayside control device 120. In this case, the communication network 250 comprises a rail-based serial communication link between the measurement device 200 and at least one of the transmitters, wherein at least one rail of the railroad track is used as the serial communication link. This embodiment is described in more detail with reference to FIG. 4.

The measurement device 200 further comprises an energy storage unit 240 adapted to harvest and store electrical energy, the electrical energy being transmitted over the rails of the railroad track, wherein the energy storage unit 240 is adapted to harvest the electrical energy from at least one of the rails of the railroad track. As described before, the power source for the measurement device 200 is a voltage potential across the rails provided by the wayside control device 120 via the transmitters and transmitter connections 122, wherein the energy storage unit 240 is configured to harvest the electrical energy from the rails.

The energy storage unit 240 can be for example a rechargeable battery to provide operation of the measurement device 200 so that electrical energy can be stored within the device 200. Thus, operation of the device 200 can still be provided during absence of track circuit power, for instance during train shunting of the track circuit 110. If no energy is available from the track circuit 110 or if the energy storage unit 240 ceases operations, the wayside control device 120 considers the track circuit 110 shunted because no signal is available for measurement by the measurement circuit 210. As soon as energy is available again, because for example the track circuit 110 is not shunted anymore, the energy storage unit 240 will harvest and store energy again, i.e. recharge. In a further embodiment, the measurement device 200 can comprise an additional power source, wherein the additional power source can be designed to harvest and store solar power, for example using photovoltaic cells installed near the measurement device 200 along the railroad track.

In a further embodiment, the measurement device 200 comprises a signal processing circuit 230 coupled to the measurement circuit 210 and adapted to process the measurement signals of the electrical quantities provided by the measurement circuit 210. For example, the signal processing circuit 230 is adapted to calculate speed, position and acceleration of a railway vehicle travelling on the railroad track and entering/exiting the section or block where the measurement system 100 and track circuit 110 is installed and to provide a signal that the track is occupied or unoccupied. Based on the voltage and current measurements by the measurement circuit 210, the signal processing circuit 230 can calculate different values, such as speed, position and acceleration of the railway vehicle. In a further embodiment, the signal processing circuit 230 is adapted to demodulate coded track signals across the rails of the railroad track. In the case that the measurement system 100 is installed for a railroad grade crossing in connection with a GCP system, the signal processing circuit 230 can further be designed to determine if an island circuit is occupied or unoccupied. Calculated and/or determined values or data of the signal processing circuit 230 can be communicated by the communications processor 220 to the wayside control device 120 via the communication network 250.

The signal processing capabilities of the measurement device 200 reduce the communications traffic in view of transmissions of high sample rate raw voltage and current readings to the wayside control device 120. Placement(s) of the measurement device 200 at various points, e.g. multiple measurement devices 200 within the track circuit 110 allows detection and compensation for anomalous track circuit phenomenon, e.g. localized bad ballast, providing improved train detection. Measurement of signals through impedance bonds could determine normal or faulty operation. The use of a communication network 250, e.g. electromagnetic spectrum or rail-based serial communication link, eliminates installation and maintenance expense of hardwired connections, for multi conductor cabling, from the wayside control device 120, typically located in a bungalow near the railroad track or other monitoring wayside equipment to the measurement circuit 210 of the measurement device 200 of the track circuit 110. Further, the measurement device 200 may be used by railroad maintenance personnel and/or in conjunction with health monitoring equipment for trouble shooting and/or failure indication of railroad tracks.

Figure 3:
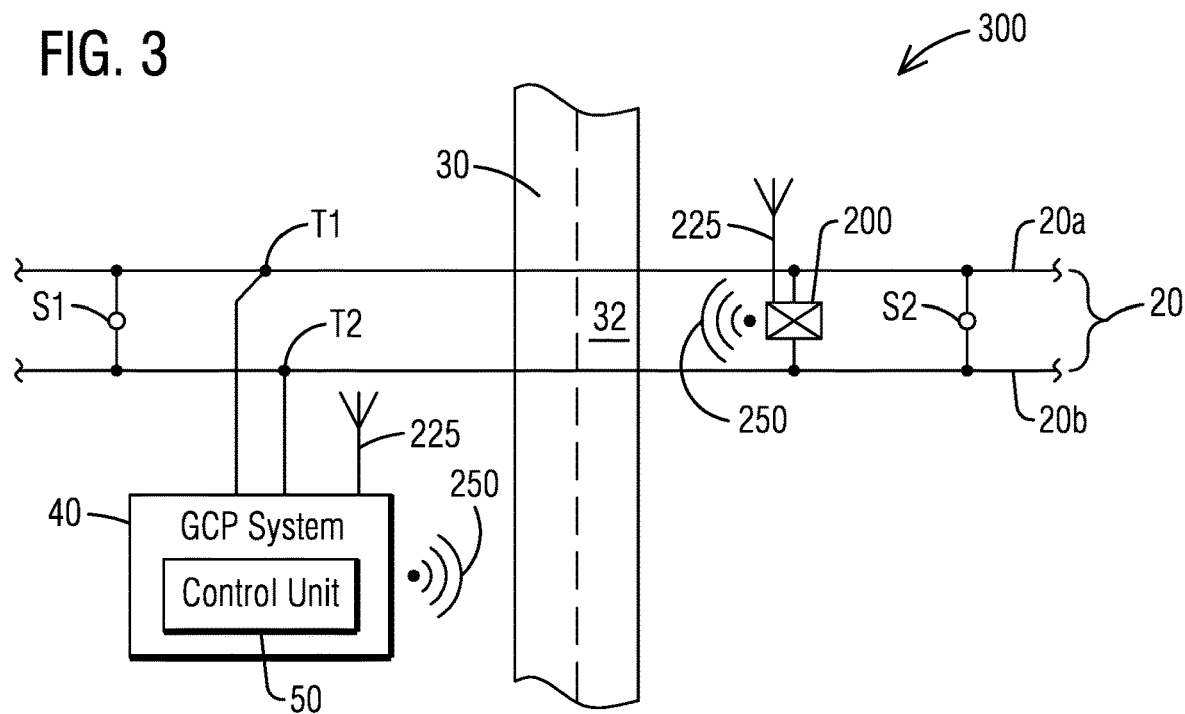
FIG. 3 illustrates an embodiment of a railroad measurement system installed at a railroad track in accordance with an exemplary embodiment of the present invention.

FIG. 3 illustrates an embodiment of a railroad measurement system 300 installed at a railroad track 20 in accordance with an exemplary embodiment of the present invention. The measurement system 300 is provided and utilized in connection with a railroad crossing, where a road 30 crosses a railroad track 20. A wayside control device is configured as a GCP system 40 with control unit 50 for producing constant warning time signals for crossing warning devices. A pair of termination shunts S1, S2 is arranged one on each side of the road 30 at a desired distance from the center of the island 32, wherein the shunts S1, S2 are connected between the rails 20a, 20b of the railroad track 20. The termination shunts S1, S2, are arranged at predetermined positions corresponding to an approach length required for a specific warning time (WT) for the GCP system 40. A constant warning time circuit of the GCP system 40 comprises at least transmitters T1 and T2 connecting to the rails 20a, 20b.

In accordance with an exemplary embodiment, the measurement system 300 comprises a measurement device 200 as described with reference to FIG. 2, wherein the communications processor 220 is configured as wireless communications processor. The measurement device 200 replaces receivers of the constant warning time circuit of the GCP system 40. The embodiment of FIG. 3 is designed so that the wireless communications processor of the measurement device 200 is adapted to interface with the GCP system 40 and to communicate measurement signals directly to the GCP system 40 via communication network 250. The communication network 250 comprises a wireless communication network, such as for example a radio frequency (RF) based wireless network. The GCP system 40 and measurement device 200 are configured to receive and/or transmit signals and/or data wirelessly via antennas 225 or other suitable device.

Figure 4:
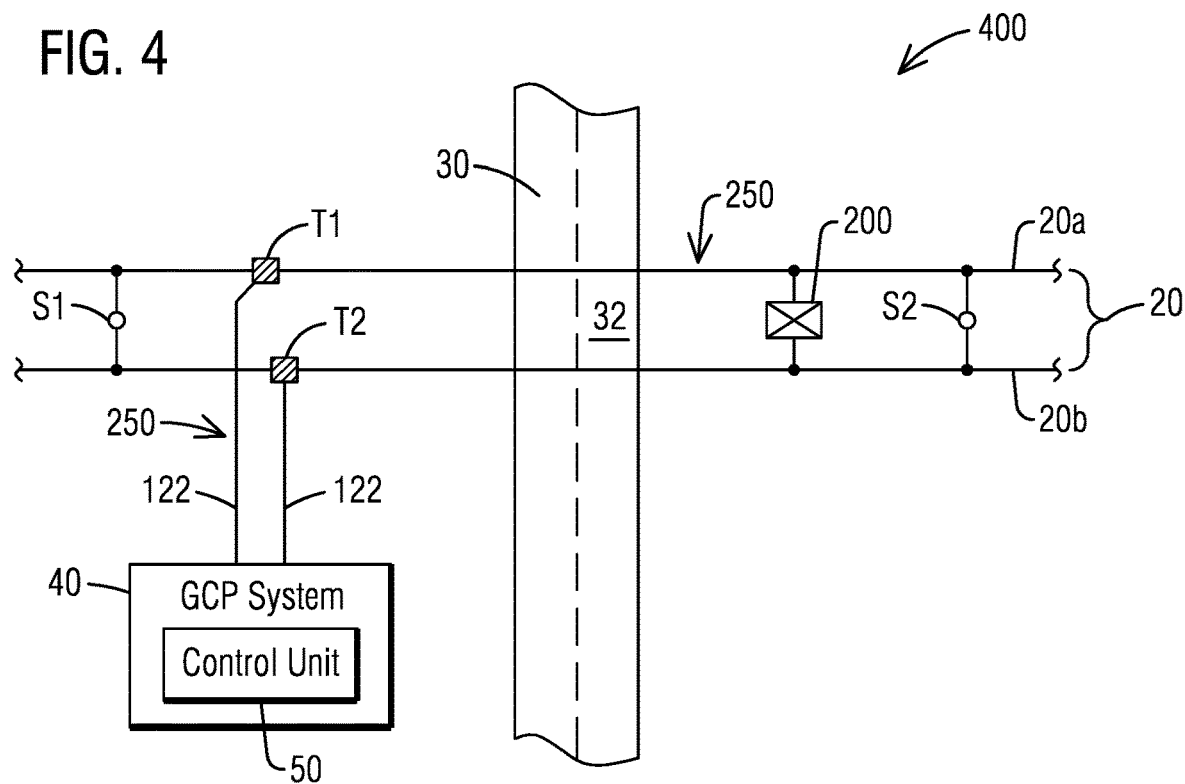
FIG. 4 illustrates another embodiment of a railroad measurement system installed at a railroad track in accordance with an exemplary embodiment of the present invention.

FIG. 4 illustrates another embodiment of a railroad measurement system 400 installed at a railroad track 20 in accordance with an exemplary embodiment of the present invention. The measurement system 400 illustrated in FIG. 4 comprises similar components as the system 300 of FIG. 3, such as for example the GCP system 40 with control unit 50, transmitters T1, T2 and measurement device(s) 200. According to the embodiment of FIG. 4, the measurement device 200 interfaces with one or both transmitters T1, T2. According to FIG. 4, the transmitter(s) T1, T2 is adapted to receive signals communicated by the measurement devices 200. The signals are transmitted between the measurement device 200 and transmitter T1 using at least one of the rails 20a, 20b of the track 20. The rails 20a, 20b are utilized as a serial data communications link to the transmitter T1. It should be noted that instead of transmitter T1, transmitter T2 (or both transmitters T1, T2) can be adapted to receive the measurement signals provided by the measurement device 200. Transmitter T1 receives the measurement signals and transmits those to the GCP system 40 using transmitter connection 122 between transmitter T1 and GCP system 40. The transmitter connections 122 are typically hardwired and can be utilized as a serial data communications link to the GCP system 40. In this embodiment, the communication network 250 is configured as a wired communication network and comprises a rail-based serial data communication link between measurement device 200 and transmitter(s) T1 and/or T2, and transmitter connections 122 between transmitter(s) T1 and/or T2 and the GCP system 40. The communications processor 220 of measurement device 200 is configured to transmit the measurement signals via at least one of the rails 20a, 20b to at least one of the transmitters T1, T2. The transmitter(s) T1, T2 is designed to receive the signals and to forward the signals to the GCP system 40 using its transmitter connections 122.

It should be noted that the embodiments as illustrated in FIG. 3 and FIG. 4 cannot only be used in connection with GCP systems 40 at railroad crossings, but also in connection with many other track circuits and wayside monitoring equipment. The measurement systems 300, 400 may only comprise one measurement device 200 coupled to the railroad track 20 or may comprise multiple measurement devices 200 installed at various locations along the railroad track 20.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. A railroad track powered measurement device comprising:
   a measurement circuit operably coupled between rails of a railroad track and adapted to measure electrical quantities across the rails and to provide measurement signals of the electrical quantities;
   a communications processor adapted to interface with one or more of the rails and to transmit, via the one or more rails, the measurement signals of the electrical quantities to a transmitter of a wayside control device, the transmitter being disposed on the one or more rails, wherein the one or more rails provide a serial communications link between the measurement device and the transmitter; and
   an energy storage unit adapted to harvest and store electrical energy, the electrical energy being transmitted over the rails of the railroad track, wherein the energy storage unit is adapted to harvest the electrical energy from at least one of the rails of the railroad track.

2. The railroad track powered measurement device of claim 1, wherein the electrical quantities comprise voltage and current, wherein the measurement circuit is adapted to measure voltage and current present at the rails of the railroad track.

3. The railroad track powered measurement device of claim 2, wherein the signal processing circuit is adapted to demodulate coded track signals across the rails of the railroad track.

4. The railroad track powered measurement device of claim 1, further comprising:
   a signal processing circuit coupled to the measurement circuit and adapted to process the measurement signals of the electrical quantities.

5. The railroad track powered measurement device of claim 4, wherein the signal processing circuit is adapted to calculate speed, position and acceleration of a railway vehicle travelling on the railroad track, and to determine that the railroad track is occupied or unoccupied.

6. A railroad measurement system comprising:
   a railroad track powered measurement device providing measurement signals of electrical quantities across rails of a railroad track;
   a wayside control device comprising a transmitter, the transmitter being disposed on one or more of the rails and being adapted to receive the measurement signals provided by the railroad track powered measurement device; and
   a communication network interfacing with the railroad track powered measurement device and interfacing with the one or more of the rails, the communication network being adapted to transmit data via the one or more rails, wherein the one or more rails provide a serial communications link between the measurement device and the transmitter,
   wherein the railroad track powered measurement device is adapted to transmit the measurement signals of the electrical quantities via the communication network, and the transmitter of the wayside control device is adapted to receive the measurement signals, the railroad track powered measurement device comprising:
   an energy storage unit adapted to harvest and store electrical energy, the electrical energy being transmitted over the rails of the railroad track, wherein the energy storage unit is adapted to harvest the electrical energy from at least one of the rails of the railroad track.

7. The railroad measurement system of claim 6, wherein the railroad track powered measurement device comprises:
   a measurement circuit operably coupled between the rails of the railroad track and adapted to measure the electrical quantities across the rails; and
   a communications processor adapted to communicate, via the communication network, the measurement signals of the electrical quantities to the transmitter of the wayside control device.

8. The railroad measurement system of claim 7, wherein the railroad track powered measurement device further comprises:
   a signal processing circuit coupled to the measurement circuit and adapted to process the measurement signals of the electrical quantities.

9. The railroad measurement system of claim 8, wherein the signal processing circuit is adapted to calculate speed, position and acceleration of a railway vehicle travelling on the railroad track.

10. The railroad measurement system of claim 8, wherein the signal processing circuit is adapted to demodulate coded track signals across the rails of the railroad track.

* * * * *